(12) United States Patent
Tschache et al.

(10) Patent No.: US 10,433,133 B2
(45) Date of Patent: Oct. 1, 2019

(54) METHOD AND APPARATUS FOR RECALLING ENTITLED AUTHENTICATION METHODS FOR A VEHICLE

(71) Applicant: VOLKSWAGEN AG, Wolfsburg (DE)

(72) Inventors: Alexander Tschache, Wolfsburg (DE); Gerald Koch, Lengede (DE)

(73) Assignee: Volkswagen AG (DE)

( * ) Notice: Subject to any disclaimer, the term of this patent is extended or adjusted under 35 U.S.C. 154(b) by 137 days.

(21) Appl. No.: 15/098,387

(22) Filed: Apr. 14, 2016

(65) Prior Publication Data

US 2016/0308675 A1    Oct. 20, 2016

(30) Foreign Application Priority Data

Apr. 14, 2015 (DE) ........................ 10 2015 206 628

(51) Int. Cl.
| | |
|---|---|
| *H04L 9/08* | (2006.01) |
| *H04W 4/80* | (2018.01) |
| *G07C 9/00* | (2006.01) |
| *B60R 25/24* | (2013.01) |
| *H04W 12/08* | (2009.01) |
| *H04L 9/32* | (2006.01) |

(Continued)

(52) U.S. Cl.
CPC ............. *H04W 4/80* (2018.02); *B60R 25/24* (2013.01); *G07C 9/00896* (2013.01); *H04L 9/0891* (2013.01); *H04L 9/3234* (2013.01); *H04W 12/08* (2013.01); *G07C 9/00817* (2013.01); *G07C 2209/62* (2013.01); *H04L 63/101* (2013.01); *H04L 2209/84* (2013.01); *H04W 12/04* (2013.01)

(58) Field of Classification Search
None
See application file for complete search history.

(56) References Cited

U.S. PATENT DOCUMENTS 8,947,202 B2    2/2015  Tucker et al.
2001/0033643 A1* 10/2001 Mulvey ................ H04M 1/663
379/196

(Continued)

FOREIGN PATENT DOCUMENTS

CN    101101679 A    1/2008
CN    101280651 A    10/2008

(Continued)

OTHER PUBLICATIONS

Office Action for Chinese Patent Application No. 201610227392.4; dated Dec. 29, 2017.

*Primary Examiner* — William J. Goodchild
(74) *Attorney, Agent, or Firm* — Barnes & Thornburg LLP

(57) ABSTRACT

A method for indicating authorized authentication media for a vehicle including detecting a key authorized for the vehicle via a first interface; ascertaining the authentication media that are authorized for the vehicle; and outputting an indication if, on the one hand, the key authorized for the vehicle was detected previously and if, on the other hand, at least one authentication medium was ascertained in the course of the ascertaining step, wherein the vehicle communicates with the authentication media via a second interface, which differs from the first interface. Also disclosed is a device and vehicle.

18 Claims, 2 Drawing Sheets

(51) Int. Cl.
*H04W 12/04* (2009.01)
*H04L 29/06* (2006.01)

(56) References Cited

U.S. PATENT DOCUMENTS

| | | | | |
|---|---|---|---|---|
| 2004/0160125 A1* | 8/2004 | Rouleau | ............... | B60R 25/021 |
| | | | | 307/10.2 |
| 2010/0073125 A1* | 3/2010 | Alrabady | .............. | H04L 9/3247 |
| | | | | 340/5.2 |
| 2013/0099892 A1* | 4/2013 | Tucker | ............... | G07C 9/00309 |
| | | | | 340/5.61 |
| 2014/0091903 A1* | 4/2014 | Birkel | .................... | B60R 25/24 |
| | | | | 340/5.54 |

FOREIGN PATENT DOCUMENTS

| | | | |
|---|---|---|---|
| CN | 104050736 A | | 9/2014 |
| DE | 102009023095 A1 | | 12/2009 |
| DE | 202010010930 U1 | | 11/2010 |
| JP | 2011144624 A | | 7/2011 |

* cited by examiner

METHOD AND APPARATUS FOR RECALLING ENTITLED AUTHENTICATION METHODS FOR A VEHICLE

PRIORITY CLAIM

This patent application claims priority to German Patent Application No. 10 2015 206 628.2, filed 14 Apr. 2015, the disclosure of which is incorporated herein by reference in its entirety.

SUMMARY

Illustrative embodiments relate to a method and a device for generating indications or warnings of authentication media (for example, smartcards, smartphones, smartwatches) authorized for a vehicle.

BACKGROUND

Nowadays it is possible, with the aid of an authorized authentication medium, to get access to a vehicle and to start this vehicle or to operate other function of the vehicle only by means of the authentication medium (that is to say, without the key of the vehicle). Of course, these authentication media authorized for the vehicle constitute a problem in connection with the sale of the vehicle, for example, since the new owner of the vehicle cannot be sure whether or not authentication media authorized for the vehicle exist, the existence of which he/she has hitherto known nothing about.

Disclosed embodiments provide a method for indicating authorized authentication media for a vehicle by a device according and by a vehicle.

BRIEF DESCRIPTION OF THE DRAWINGS

Disclosed embodiments will be described in detail in the following with reference to the drawings.

DETAILED DESCRIPTION OF THE DISCLOSED EMBODIMENTS

Figure 1:
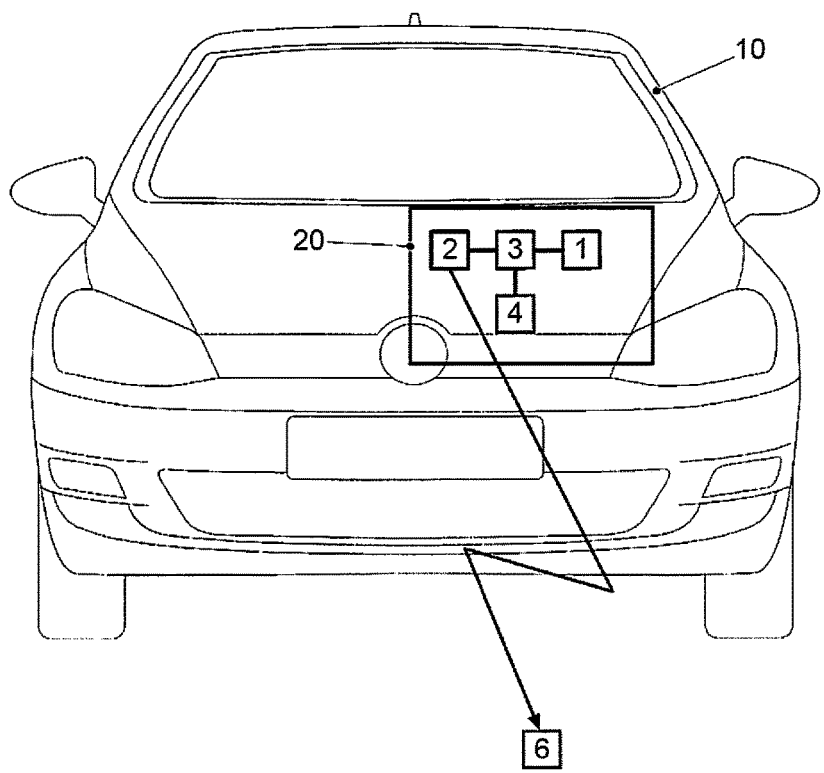
FIG. 1 represents schematically a disclosed vehicle in communication with an authorized vehicle key.

Disclosed embodiments provide a method for indicating authorized authentication media for a vehicle. The disclosed method comprises:

Detecting a vehicle key that is authorized for the vehicle.

Ascertaining one or more authentication media that are authorized for the vehicle. For this purpose the vehicle can search in a memory of the vehicle for indications (identifications) of the authentication media authorized for the vehicle and/or can also search, for example, by radio communication, in memories outside the vehicle for authentication media authorized for the vehicle.

Outputting an indication or a warning if in the course of the ascertainment of the authentication medium/media at least one authentication medium was ascertained that has an authorization for the vehicle. The output of the indication may, for example, occur when the ignition of the vehicle is enabled by the detected vehicle key or when the immobilizer of the vehicle is deactivated with the detected vehicle key.

By virtue of the fact that the indication or warning about the authorized authentication media is output only when the vehicle key authorized for the vehicle is detected previously, it can be assumed with some certainty that only one authorized owner of the vehicle receives this indication. By virtue of the indication, this authorized owner is informed of the fact that there is at least one other authentication medium (in addition to the authorized vehicle key(s)) with which access to the vehicle is possible. If this indication constitutes a surprise for the owner, since the owner is assuming that there should be no authentication media authorized for the vehicle, the owner can now take appropriate measures to take way from the authentication media their authorization for the vehicle.

In particular, the vehicle key authorized for the vehicle is a so-called primary key, whereas each one of the authentication media is a so-called secondary key. Only the primary key is authorized to confer on a secondary key an authorization for the vehicle or to generate a secondary key having an authorization for the vehicle.

The vehicle key authorized for the vehicle may be, on the one hand, a transponder which is detected via a keyless entry system of the vehicle. Apart from this, the vehicle key authorized for the vehicle may be a conventional vehicle key which is detected by the vehicle only when the vehicle key has been inserted into an ignition lock of the vehicle.

In other words, the following variants exist for the vehicle key authorized for the vehicle:

A conventional vehicle key (as a rule, without transponder) which is detected by the vehicle when the vehicle key has been inserted into an ignition lock of the vehicle.

A vehicle key with transponder, which has to be inserted at a predetermined place in the dashboard to be detected in wireless manner by the vehicle.

A vehicle key with transponder, which is detected in wireless manner by the vehicle as soon as the vehicle key is located in the passenger compartment of the vehicle or within a predetermined distance from the vehicle.

Whereas each one of the authorized authentication media communicates with the vehicle, in particular in wireless manner, only over a short range (for example, via a near-field communication (NFC), Bluetooth or a WLAN connection), is the authorized vehicle key detected by the vehicle, as a rule, via a conventional method which is also employed in the case of a keyless entry system. In the case of this method, the vehicle emits an inquiry signal having an LF frequency (20 kHz to 130 kHz), which is detected by the vehicle key (more precisely, by the transponder of the vehicle key). The vehicle key (more precisely, the transponder of the vehicle key) replies to the inquiry signal with a confirmation signal having an HF frequency (300 MHz to 900 MHz).

The 'vehicle key that is authorized for the vehicle', is understood in this case to mean, in particular, a vehicle key that is authorized only for this one vehicle. An 'authentication medium' is understood to mean, in particular, any card or any portable instrument that is able to communicate its identification to the vehicle via a wireless communication. The authentication medium may be a smartcard or a mobile radio transceiver (for example, a smartphone or smartwatch). An 'appliance' (key or authentication medium) that is authorized for the vehicle is understood in this case to mean in particular an appliance with which the owner of this appliance can unlock and/or start the vehicle and/or operate a function of the vehicle (for example, opening the luggage compartment) in an authorized manner (that is to say, without damaging the vehicle or gaining illegal access).

The vehicle communicates with the vehicle key authorized for the vehicle via a first interface, and with the authentication medium authorized for the vehicle via a second interface, which differs from the first interface. The first interface may be, for example, the ignition lock or the already described interface of a keyless entry system, whereas the second interface may be an interface for NFC, Bluetooth or WLAN. The vehicle is accordingly capable of distinguishing between the vehicle key and the authentication medium on the basis of the interface via which the vehicle key or the authentication medium communicates with the vehicle.

The indication can be output, for example, via a display (for example, of the instrument cluster or of the infotainment system) of the vehicle. In this case the indication may comprise a list of the authorized authentication media, in which case each authorized authentication medium can be output by means of its identification, its authorization and its authorization period. The authorization of the respective authentication medium specifies those functions of the vehicle for which the respective authentication medium has an authorization. The authorization period defines that period of time over which the respective authentication medium possesses the corresponding authorization for the vehicle.

Disclosed embodiments also provide a device for indicating authorized authentication media for a vehicle. The device comprises output means and control means. The control means have been configured to detect a vehicle key authorized for the vehicle and to ascertain authentication media authorized for the vehicle. The output means have been configured to output an indication when at least one authentication medium authorized for the vehicle has been ascertained.

The benefits of the disclosed device correspond substantially to the benefits of the disclosed method which have already been explained in detail, so repetition will be dispensed with here.

Lastly, disclosed embodiments provide a vehicle that includes the disclosed device.

Disclosed embodiments are suitable, in particular, for motor vehicles. Obviously the disclosed embodiments are not restricted to this particular field of application, since the disclosed embodiments can also be employed in ships, aircraft and also rail-bound or track-guided vehicles. Apart from this, the disclosed embodiments are also suitable, at least in principle, for stationary objects (for example, houses).

Represented schematically in FIG. 1 is a vehicle 10 with a disclosed device 20, which is in near-field communication with a vehicle key 6 authorized for the vehicle 10. The device 20 itself comprises a display 1, an antenna 2, a controller 3 and a memory 4. With the antenna 2, which may also consist of several antennas for differing frequencies, the device 20 can set up a radio communication both with a radio key 6 authorized for the vehicle and with an authentication medium (for example, a smartcard or a smartphone) authorized for the vehicle. As soon as the controller 3 detects an authorized vehicle key 6 on the basis of the evaluation of the radio communication, the controller 3 ascertains the authentication media authorized for the vehicle by a check being made, with the aid of the memory 1, as to whether authentication media authorized for the vehicle 10 are known to the device 20. If the controller 3 ascertains at least one authentication medium authorized for the vehicle, the authentication media authorized for the vehicle 10 are output on the display 1.

Figure 2:
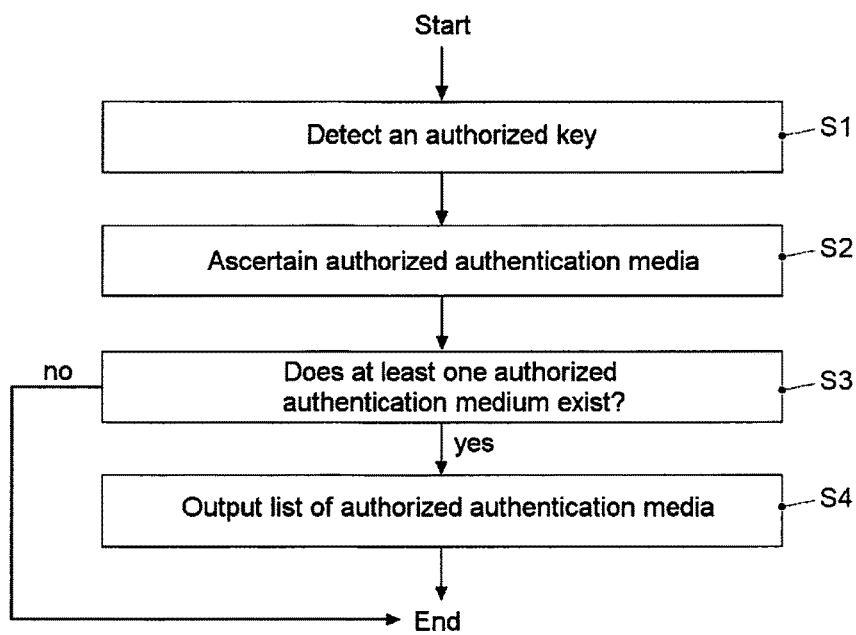
FIG. 2 represents the flow chart of a disclosed method.

The flow chart of a disclosed method is represented in FIG. 2.

The method starts whenever a vehicle key authorized for the vehicle is detected in step S1. In this case, in step S2 the authentication media authorized for the vehicle are ascertained. In the following step S3, a check is made as to whether at least one authentication medium authorized for the vehicle could be ascertained in step S2. If this is not the case, the method terminates. If, on the other hand, at least one authentication medium authorized for the vehicle was ascertained in step S2, in step S4 a list of the authentication media authorized for the vehicle is output.

Disclosed embodiments relate to a method and a device for generating indications or warnings of authentication media (for example, smartcards, smartphones, smartwatches) authorized for a vehicle.

DE 10 2009 023 095 A1 discloses a device and a method for programming vehicle keys for establishing primary and secondary drivers. In this case, the driver can be guided to a system-check menu, to see the number of primary and/or secondary keys that have been programmed in respect of the vehicle.

DE 20 2010 010 930 U1 discloses an identification chip for a motor vehicle.

U.S. Pat. No. 8,947,202 B2 describes methods for getting access to a vehicle using portable devices and/or for activating the vehicle using portable devices.

The invention claimed is:

1. A method for indicating that one or more authentication media have been previously authorized for control of functionality of a transportation vehicle, the method comprising:
   detecting a key authorized for controlling functionality of the transportation vehicle via a first interface of the transportation vehicle;
   ascertaining whether one or more authentication media have been previously authorized to control functionality of the transportation vehicle; and
   in response to the detected key having been detected previously via the first interface, outputting an indication of whether the ascertainment indicated that one or more authentication media have been previously authorized to control functionality of the transportation vehicle, wherein the indication is output via display included in the transportation vehicle;
   communicating, by the transportation vehicle, with the one or more authentication media via a second interface of the transportation vehicle, which differs from the first transportation vehicle interface,
   wherein the key authorized for the transportation vehicle is a primary key and the one or more authentication media is a secondary key.

2. The method of claim 1, wherein the key authorized for the transportation vehicle is a transponder which is detected via a keyless entry system of the transportation vehicle.

3. The method of claim 1, wherein the one or more authentication media that are authorized to control functionality of the transportation vehicle are configured to wirelessly communicate with the transportation vehicle only over a short range.

4. The method of claim 1, wherein the primary key is authorized to confer on the secondary key an authorization for the transportation vehicle or to generate the secondary key having the authorization for the transportation vehicle.

5. The method of claim 1, wherein the indication includes a list of the authorized authentication media, and at least one of specification of those transportation vehicle functions for each authentication medium and specification of an authorization period during which the authentication medium possesses the authorization for the transportation vehicle.

6. The method of claim 1, wherein the detection of the key authorized for the transportation vehicle is performed when the key has been inserted into an ignition lock of the transportation vehicle.

7. A device for indicating that one or more authentication media have been previously authorized for control of functionality of a transportation vehicle, wherein the device comprises:
- an output; and
- a controller coupled to the output and configured to detect a key authorized for controlling functionality of the transportation vehicle via a first interface of the transportation vehicle and to ascertain whether one or more authentication media have been authorized to control functionality of the transportation vehicle,
- wherein the output and the controller are configured to cooperate to, in response to the controller having previously detected the detected key via the first interface, outputting an indication of whether the ascertainment indicated that one or more authentication media have been previously authorized to control functionality of the transportation vehicle, wherein the indication is output via display in the transportation vehicle,
- wherein the controller is configured to communicate with the one or more authentication media via a second interface of the transportation vehicle, which differs from the first transportation vehicle interface, and
- wherein the key authorized for the vehicle is a primary key and the one or more authentication media is a secondary key.

8. The device of claim 7, wherein the key authorized for the vehicle is a transponder which is detected via a keyless entry system of the transportation vehicle.

9. The device of claim 7, wherein the one or more authentication media that are authorized for the vehicle are configured to wirelessly communicate with the vehicle only over a short range.

10. The device of claim 7, wherein the primary key is authorized to confer on the secondary key an authorization for the transportation vehicle or to generate the secondary key having the authorization for the transportation vehicle.

11. The device of claim 7, wherein the indication includes a list of the authorized authentication media, and at least one of specification of those transportation vehicle functions for each authentication medium and specification of an authorization period during which the authentication medium possesses the authorization for the transportation vehicle.

12. The device of claim 7, wherein the detection of the key authorized for the transportation vehicle is performed when the key has been inserted into an ignition lock of the transportation vehicle.

13. A transportation vehicle with a device for indicating that one or more authentication media have been previously authorized for control of functionality of a transportation vehicle, wherein the device includes an output and a controller coupled to the output, wherein the controller is configured to detect a key authorized to control functionality of the transportation vehicle via a first interface of the transportation vehicle, and to ascertain whether one or more authentication media have been previously authorized to control functionality of the transportation vehicle, and the output and the controller are configured to in response to the controller having previously detected the detected key, output an indication whether the ascertainment indicated that one or more authentication media have been previously authorized to control functionality of the transportation vehicle,
- wherein the controller is configured to communicate with the one or more authentication media via a second interface of the transportation vehicle, which differs from the first interface of the transportation vehicle, and
- wherein the key authorized for the transportation vehicle is a primary key, the one or more authentication media is a secondary key.

14. The transportation vehicle of claim 13, wherein the key authorized for the transportation vehicle is a transponder which is detected via a keyless entry system of the transportation vehicle.

15. The transportation vehicle of claim 13, wherein the one or more authentication media that are authorized for the transportation vehicle are configured to wirelessly communicate with the transportation vehicle only over a short range.

16. The transportation vehicle of claim 13, wherein the primary key is authorized to confer on the secondary key an authorization for the transportation vehicle or to generate the secondary key having the authorization for the transportation vehicle.

17. The transportation vehicle of claim 13, wherein the indication includes a list of the authorized authentication media, and at least one of specification of those transportation vehicle functions for each authentication medium and specification of an authorization period during which the authentication medium possesses the authorization for the transportation vehicle.

18. The transportation vehicle of claim 13, wherein the detection of the key authorized for the transportation vehicle is performed when the key has been inserted into an ignition lock of the transportation vehicle.

* * * * *